United States Patent [19]

Matsuda et al.

[11] 3,933,748

[45] Jan. 20, 1976

[54] ANAEROBIC ADHESIVE CONTAINING TETRAHYDROQUINOLINE AND BENZOSULFIMIDE

[75] Inventors: Hideaki Matsuda; Takanori Okamoto, both of Kagawa, Japan

[73] Assignee: Okura Kogya Kabushiki Kaisha, Japan

[22] Filed: Aug. 16, 1974

[21] Appl. No.: 498,207

[30] Foreign Application Priority Data
Aug. 21, 1973 Japan.................................. 48-92904

[52] U.S. Cl. ... 260/47 EP; 260/47 UA; 260/47 EQ; 260/78.5 R; 260/78.5 A; 260/89.5 R; 260/89.5 A; 428/458
[51] Int. Cl.² ................ C08F 218/14; C08G 81/00; C08F 120/02
[58] Field of Search..... 260/78.5 R, 78.5 A, 89.5 R, 260/89.5 A, 47 UA, 47 EP, 47 EQ

[56] References Cited
UNITED STATES PATENTS

| | | |
|---|---|---|
| 2,895,950 | 7/1959 | Krieble............................ 260/89.5 R |
| 3,041,322 | 6/1962 | Krieble............................ 260/89.5 R |
| 3,046,262 | 7/1962 | Krieble............................ 260/89.5 R |
| 3,218,305 | 11/1965 | Krieble .......................... 260/89.5 A |
| 3,591,438 | 7/1971 | Toback et al................. 260/86.1 R |
| 3,687,860 | 7/1972 | Matsuda et al. ........... 260/78.5 R X |
| 3,689,427 | 9/1972 | Matsuda et al. ........... 260/78.5 R X |

*Primary Examiner*—Joseph I. Schofer
*Assistant Examiner*—Herbert J. Lilling

[57] ABSTRACT

An adhesive composition which can be applied to various metals and be polymerized and cured upon exclusion from contact with air is disclosed, said composition comprising (1) an anaerobic mixture consisting of a compound represented by the formula

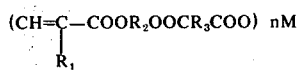

a solvent compound having in the molecule an acrylic or methacrylic group, (2) a small amount of benzosulfimide, (3) tetrahydroquinoline and (4) an organic peroxide.

4 Claims, No Drawings

ANAEROBIC ADHESIVE CONTAINING TETRAHYDROQUINOLINE AND BENZOSULFIMIDE

FIELD OF THE INVENTION

This invention relates to an anaerobic adhesive composition which can bond various metals, said composition comprising an anaerobic mixture consisting of a polyvalent metal salt of a compound represented by the following general formula $$CH_2=C-COOR_2OOCR_3COOH \qquad [1]$$
$$\phantom{CH_2=C-}|$$
$$\phantom{CH_2=C-}R_1$$

wherein $R_1$ is a hydrogen atom or methyl group, $R_2$ is an aliphatic, alicyclic or aromatic polyhydric alcohol residue, and $R_3$ is an aliphatic, alicyclic or aromatic polybasic carboxylic acid residue, and a solvent compound having in the molecule an acrylic or methacrylic group, and incorporated therein, small amounts of benzosulfimide, tetrahydroquinoline and an organic peroxide.

DESCRIPTION OF THE PRIOR ART

A number of so-called anaerobic adhesives which are polymerized and cured under exclusion from contact with air to exhibit a bonding activity have been known in the art. However, these known anaerobic adhesives have defects and shortcomings such as mentioned below.

In case a curing accelerator is not used in combination, the time required for completion of setting and bonding is extremely long. Further, if metals other than those of iron and copper types are bonded with use of conventional anaerobic adhesives, it generally takes a long time to complete setting and bonding and, in some cases, it is impossible to bond metals. Because of these defects, the application fields of these known anaerobic adhesives are much limited.

In conventional anaerobic adhesives, especially those of the polyether methacrylate type, it is known that tetrahydroquinoline is a strong bonding accelerator together with benzosulfimide acting as an auxiliary accelerator. When tetrahydroquinoline is employed, it is necessary to employ a particular stabilizer such as hydroquinone, 1,4-benzoquinone, hydroquinone monomethyl ether, 2,5-diphenyl-p-benzoquinone in an amount of about 50 to about 600 ppm in proportion to the amount of used tetrahydroquinoline, which results in operational troubles. Further, anaerobic adhesives formed by incorporation of these stabilizers are defective in that they are darkly colored or the bonding speed differs among lots.

DETAILED EXPLANATION OF THE INVENTION

The effects attained by the anaerobic adhesive composition of this invention are as follows:

a. The time required for setting is shorter than in the case of conventional known adhesive compositions.

b. The adhesive composition can bond not only metals of iron and copper types but also other various metals.

c. The stability is much higher than that of conventional adhesive compositions.

d. The compound of the general formula [1], which is used as one component, can be manufactured with ease from starting materials that can be prepared on an industrial scale at a low cost.

DETAILED DESCRIPTION OF THE INVENTION

This invention is to provide an anaerobic adhesive composition having a high bonding property.

More specifically, in accordance with this invention, there is provided an anaerobic adhesive composition which has a quick setting property and can bond tightly not only metals of copper and iron types but also other various metals, said composition comprising an anaerobic mixture containing a polyvalent metal salt of a compound represented by the following general formula [1]

$$CH_2=C-COOR_2OOCR_3COOH \qquad [1]$$
$$\phantom{CH_2=C-}|$$
$$\phantom{CH_2=C-}R_1$$

and incorporated therein, small amounts of an organic peroxide as a curing catalyst, tetrahydroquinoline as a curing accelerator and stabilizer and benzosulfimide as a promoter.

It is quite surprising that in this invention tetrahydroquinoline has good activities not only as an accelerator but also as a stabilizer, through a compound of the general formula [1] is the polyester methacrylate type.

The reason why in the anaerobic adhesive composition of this invention tetrahydroquinoline acts effectively not only as an accelerator but also as a stabilizer has not completely been elucidated, but it is surmised that high synergetic effects can be attained by tetrahydroquinoline and the metal salt contained in the anaerobic mixture of this invention.

It is permissible to further incorporate a known stabilizer such as hydroquinone into the adhesive composition of this invention.

A metal salt of the compound of the general formula [1] acts effectively as a stabilizer when used in combination with tetrahydroquinoline in the anaerobic adhesive composition of this invention. Moreover, incorporation of this metal salt imparts to the resulting adhesive composition such properties that the composition can bond various metals and can bond even an oil coated surface tightly and promptly without use of a primer.

Compounds represented by the general formula [1] can easily be prepared from basic raw materials that are manufactured on an industrial scale at a low cost. More specifically, compounds of the general formula [1] where $R_1$ is hydrogen are readily derived from acrylic acid, and those in which $R_1$ is a methyl group are readily derived from methacrylic acid. In the above general formula [1] $R_2$ stands for an aliphatic, alicyclic or aromatic polyhydric alcohol residue, and though the chain length of the residue $R_2$ is not particularly critical, a residue of a relatively short chain length, such as ethylene, propylene and chloropropylene groups, is preferred. $R_3$ is a residue of an aliphatic, alicyclic or aromatic polybasic carboxylic acid, and an aromatic dibasic acid residue is especially preferred as $R_3$.

As specific examples of the compound represented by the general formula [1], there can be mentioned ethyleneglycol methacrylate phthalate, propyleneglycol methacrylate phthalate, ethyleneglycol methacrylate succinate, propyleneglycol methacrylate succinate, propyleneglycol methacrylate hexahydrophthalate, a partially esterified product of succinic acid anhydride with bis-phenol dihydroxyethyl ether monomethacrylate and a partially esterified product of phthalic anhydride with hydrogenated bis-phenol A monomethacrylate.

As regards the synthesis of these compounds, it is advantageous to subject a partial esterification reaction of a partial methacrylate of polyhydric alcohol with a polybasic carboxylic acid anhydride. Various method can be adopted for the synthesis of compounds of the general formula [1], and according to any method, they can be prepared with ease on an industrial scale at a low cost.

Polyvalent metal salts of these compounds represented by the general formula [1] can be prepared by various known methods. For example, they can be obtained by subjecting a compound of the general formula [1] and an oxide or hydroxide of a polyvalent metal to the neutralization reaction in the presence or absence of a solvent. Though an inert solvent such as benzene and toluene can be used as the solvent for this neutralization reaction, it is difficult to remove it after the reaction. So it is preferred that a compound containing a methacrylic or acrylic group is employed as the solvent, because it is included as one component in the adhesive composition and need not be particularly removed by distillation or the like after the reaction.

In this invention, a solvent compound having in the molecule an acrylic or methacrylic group is combined with the above-mentioned polyvalent metal salt of the compound of the general formula [1] to form an anaerobic mixture. The following compounds are used as the solvent compound:

a. Alkyl esters of methacrylic acid and acrylic acid.
b. Hydroxyalkyl esters of methacrylic acid and acrylic acid.
c. Methacrylates and acrylates of polyhydric alcohols.
d. Polyester methacrylates and polyester acrylates.
e. Compounds of the general formula [1] and adducts of compounds of the general formula [1] and epoxy compounds.
f. Epoxy methacrylates and epoxy acrylates.

As specific examples of the compound of the type (c), there can be mentioned ethyleneglycol dimethacrylate, polyethyleneglycol dimethacrylate, trimethylolpropane monomethacylate, trimethylolpropane trimethacrylate, and corresponding acrylates.

As specific examples of the compound of the type (d), there can be mentioned dimethacrylate bis-(ethyleneglycol) phthalate and diacrylate bis-(ethyleneglycol) phthalate.

As specific examples of the compound of the type (e), there can be mentioned an adduct of a monomethacryloyloxypropyl ester of phthalic or succinic acid and glycidyl methacrylate, and an adduct of a monomethacryloyloxypropyl ester of phthalic or succinic acid and propylene oxide.

As specific examples of the compound of the type (f), there can be mentioned an adduct of a diglycidyl ether of 2,2-bis(4-hydroxyphenyl)propane and methacrylic or acrylic acid, e.g., 2,2-bis[4-(methacryloyloxy-2-hydroxypropoxy) phenyl]propane, and an adduct of diglycidyl phthalate and methacrylic or acrylic acid, e.g., di-(methacryloyloxy-2-hydroxypropyl) phthalate.

A solvent compound such as mentioned above is generally employed in an amount of about 10 to 100 parts by weight per 100 parts by weight of the compound of the general formula [1]. A mixture of two or more of these solvent compounds can also be employed. Such properties as the viscosity and the bonding strength of the resulting adhesive composition can be varied within broad ranges by changing the kind and amount of the solvent compound to be used.

Various polyvalent metals can be used for formation of polyvalent metal salts of the compound of the general formula [1], but use of divalent metals such as calcium, magnesium and zinc is especially preferred. In view of the reactivity, the solubility and the like, it is preferred that metal oxides and hydroxides such as $Ca(OH)_2$, CaO, $Mg(OH)_2$, MgO, $Zn(OH)_2$ and the like be used for formation of the polyvalent metal salt of the compound of the general formula [1].

In this invention, benzosulfimide acting as an auxiliary bonding accelerator is used in an amount of about 0.01 to about 5% by weight, preferably 0.1 to 1.0% by weight, based on the anaerobic mixture. Although other amides and imides such as succinimide, phthalimide and formamide are effective as auxiliary accelerators, they are inferior to benzosulfimide with respect to the setting rate. If benzosulfimide is not at all incorporated, the bonding rate is extremely low and the resulting composition has no practical utility as an adhesive.

It is preferred that the amount of tetrahydroquinoline acting as an accelerator and stabilizer is 0.5 to 3 times, especially 1 to 2 times, the amount used of benzosulfimide i.e. 0.005 to 15% by weight of the mixture. It must be noted that when the amount of benzosulfimide is larger than the amount of tetrahydroquinoline, it sometimes happens that the storage stability of the resulting composition is degraded.

As the organic peroxide to be added as a curing agent, hydroperoxides such as tertiary butyl hydroperoxide, cumene hydroperoxide, di-isopropylbenzene hydroperoxide and p-menthane hydroperoxide are most effective, and ketone peroxides, dialkyl peroxides and peroxy esters can also be employed in some cases. A mixture of two or more of these organic peroxides can also be employed effectively. The organic peroxide is generally incorporated in an amount of about 0.1 to about 10% by weight based on the anaerobic mixture, but in some special cases the amount of the organic peroxide can be reduced below 0.1% by weight. However, if the organic peroxide is used in an amount exceeding 10% by weight, the excessive peroxide acts merely as a diluent and does more harm than good.

POSSIBILITY OF INDUSTRIAL APPLICATION OF THE INVENTION

The adhesive composition of this invention has the exceptional property that it is polymerized and cured upon exclusion from contact with air to exhibit a bonding activity.

Therefore, it can be applied to, for example, prevention of loosening of metallic bolts and nuts, fixation of shafts of bearings and motors and sealing of tube joints instead of mechanical fixing means.

Further, the adhesive composition of this invention can without use of primer, tightly and promptly bond materials that can hardly be bonded with conventional anaerobic adhesives, such as materials plated with such a metal as nickel, chromium and zinc, stainless steels, oil coated surfaces and the like.

In addition to the above-mentioned indispensable ingredients, the anaerobic adhesive composition of this invention may further comprise plasticizers such as di-n-butyl phthalate, dimethyl sebacate and tricresyl phosphate, thickners such as silica, alumina and organic soluble polymers, dyes, UV absorbers and the like.

This invention will now be illustrated more detailedly by reference to Examples, in which all of "parts" are on the weight basis.

EXAMPLE 1

Synthesis of Anaerobic Mixture [A]

A four-neck flask equipped with a stirrer, an air condenser and a thermometer was charged with 152 parts of 2-hydroxypropyl methacrylate, 40 parts of succinic anhydride and 5 parts of triethylbenzyl ammonium chloride, and the mixture was heated and agitated at 90°C. for 3 hours. Then, 27 parts of glycidyl methacrylate was gradually added to the reaction mixture, and reaction was further continued at 90°C. for 3 hours to obtain a light-yellow, transparent, viscous liquid having an acid value of 68. This liquid product was incorporated with 30% by weight of 2-hydroxypropyl methacrylate as the solvent compound and with magnesium oxide in an amount of 70% of the theoretical amount necessary for neutralization, and the mixture was reacted at 70°C. for 4 hours to obtain a light-yellow, transparent, lowly viscous mixture of an anaerobic compound containing a magnesium salt thereof (hereinafter referred to as "anaerobic mixture [A]").

EXAMPLE 2

Synthesis of Anaerobic Mixture [B]

The light-yellow, transparent liquid of an acid value of 68 obtained in Example 1 was incorporated with 30% by weight of 2-hydroxypropyl methacrylate as the solvent compound and with calcium oxide as the neutralizer in an amount of 70% of the theoretical amount necessary for neutralization, and the mixture was reacted at 70°C. for 3 hours to obtain a light-yellow, transparent, lowly viscous anaerobic mixture [B] containing a calcium salt.

EXAMPLE 3

Synthesis of Anaerobic Mixture [C]

A four-neck flask equipped with the same devices as used in Example 1 was charged with 156 parts of 2-hydroxypropyl methacrylate, 59 parts of phthalic anhydride and 5.5 parts of triethylbenzyl ammonium chloride, and the mixture was reacted at 90°C. for 3 hours. Then, 21 parts of glycidyl methacrylate was gradually added to the reaction mixture, and reaction was carried out at 90°C. for 3 hours to obtain a light-yellow, transparent, viscous liquid having an acid value of 67. The so obtained liquid was incorporated with 30% by weight of 2-hydroxypropyl methacrylate as the solvent compound and with zinc hydroxide in an amount of 70% of the theoretical amount necessary for neutralization, and the mixture was reacted at 70°C. for 4 hours to obtain a light-yellow, transparent, lowly viscous anaerobic mixture [C] containing a zinc salt.

EXAMPLE 4

Synthesis of Anaerobic Mixture [D]

A four-neck flask equipped with the same devices as used in Example 1 was charged with 75 parts of 2-hydroxypropyl methacrylate, 31 parts of hexahydrophthalic anhydride and 2.8 parts of triethylbenzyl ammonium chloride, and the mixture was reacted at 90°C. for 2 hours. Then, 12 parts of glycidyl methacrylate was gradually added dropwise to the reaction mixture, and reaction was carried out at 90°C. for 2 hours to obtain a light-yellow, transparent, viscous liquid having an acid value of 66. The so obtained liquid was incorporated with 30% by weight of 2-hydroxypropyl methacrylate as the solvent compound and with zinc hydroxide in an amount of 70% of the theoretical amount necessary for neutralization, and the mixture was reacted at 80°C. for 4 hours to obtain a light-yellow, transparent, lowly viscous anaerobic mixture [D] containing a zinc salt.

EXAMPLE 5

An anaerobic adhesive (a) was prepared from the components given below, and physical properties were determined to obtain results shown in Table 1.

It was found that the anaerobic adhesive composition (a) exhibited a good bonding property to a zinc plating which could hardly be bonded by any of commercially available products. Further, the anaerobic adhesive (a) showed a considerable quicksetting property in comparison with commercially available products.

Composition of Anaerobic Adhesive (a):
| | | |
|---|---|---|
| Anaerobic mixture [A] | 30 | parts |
| Anaerobic mixture [C] | 10 | parts |
| 1,2,3,4-Tetrahydroquinoline | 0.4 | part |
| Benzosulfimide | 0.2 | part |
| Cumene hydroperoxide | 1.2 | parts |

Table 1

| Material Bonded | | | | | |
|---|---|---|---|---|---|
| Aluminum | | Nickel Plating | | Chromium Plating | |
| Setting Time (min) | Fracture Torque (Kg-cm) | Setting Time (min) | Fracture Torque (Kg-cm) | Setting Time (min) | Fracture Torque (Kg-cm) |
| 20 | material fracture | 40 | 460 | 20 | 470 |
| Stainless Steel | | Iron | | Zinc | |
| Setting Time (min) | Fracture Torque (Kg-cm) | Setting Time (min) | Fracture Torque (Kg-cm) | Setting Time (min) | Fracture Torque (Kg-cm) |
| 100 | 200 | 10 | 400 | 120 | 270 |

In the foregoing test, as articles to be bonded, there were employed three-eighths inch bolts and nuts of the same scale, and they were not subjected to the degreasing treatment. The setting time was determined by coating the adhesive to the bolt and nut at 23°C., bonding them and measuring the time from the bonding point to the point when the bonded nut could not be moved by hands. The fracture torque was determined by bonding the bolt and nut in the same manner as above, allowing them to stand still at 23°C. for 24 hours and measuring the strength at which the adhesive phase was first fractured by means of a torque wrench. In the subsequent Examples, the setting time and fracture torque were determined in the same manners as described above.

The gelation time of the anaerobic adhesive (a) of this invention was more than 100 minutes at 82°C. and was more than 1 month at 50°C. In conventional anaerobic adhesives, if the gelation time is more than 30 minutes at 82°C., it is construed that the adhesives are stable for more 6 months to 1 year at room temperature. In view of the foregoing, it will readily be understood that the anaerobic adhesive of this invention is very stable though it has a quick-setting property.

EXAMPLE 6

The following anaerobic adhesive (b) and (c) were prepared and their physical properties were determined according to the method described in Example 5 to obtain results shown in Table 2, from which it is seen that each of them had excellent properties.

Composition of Anaerobic Adhesive (b):
| | | |
|---|---|---|
| Anaerobic mixture [B] | 30 | parts |
| Anaerobic mixture [C] | 10 | parts |
| 1,2,3,4-Tetrahydroquinoline | 0.4 | part |
| Benzosulfimide | 0.2 | part |
| Cumene hydroperoxide | 1.2 | parts |

Composition of Anaerobic Adhesive (c):
| | | |
|---|---|---|
| Anaerobic mixture [D] | 40 | parts |
| 1,2,3,4-Tetrahydroquinoline | 0.4 | part |
| Benzosulfimide | 0.2 | part |
| Cumene hydroperoxide | 1.2 | parts |

Table 2

| Physical Properties | Anaerobic Adhesive (b) | Anaerobic Adhesive (c) |
|---|---|---|
| Gelation time at 82°C. | more than 100 minutes | more than 100 minutes |
| Gelation time at 50°C. | more than 1 month | more than 1 month |
| Zinc-plated bolt and nut | | |
| Setting time (min) | 150 | 130 |
| Fracture torque (Kg-cm) | 230 | 280 |
| Iron bolt and nut | | |
| Setting time (min) | 20 | 13 |
| Fracture torque (Kg-cm) | 410 | 320 |

EXAMPLE 7

In the composition of the anaerobic adhesive (a), the amount of 1,2,3,4-tetrahydroquinoline was changed within a range of 0.5 to 1.5% by weight while using benzosulfimide in an amount of 0.5% by weight, and the stability to gelation was determined with respect to each of obtained anaerobic adhesives to obtain results shown in Table 3, from which it is seen that 1,2,3,4-tetrahydroquinoline has a good stabilizing activity to gelation. In this test, no change of the physical properties such as the setting time and the fracture torque was brought about by the change in the amount incorporated of 1,2,3,4-tetrahydroquinoline.

Table 3

| Amount Added (% by weight) of 1,2,3,4-Tetrahydroquinoline | Gelation Time (min) at 82°C. |
|---|---|
| 0.5 | 40 |
| 0.7 | 80 |
| 1.0 | more than 100 |
| 1.25 | more than 100 |
| 1.50 | more than 100 |

REFERENTIAL EXAMPLE 1

In the composition of the anaerobic adhesive (a), instead of 1,2,3,4-tetrahydroquinoline, other tertiary amines indicated in Table 4 were employed, and the stability was determined with respect to each of the resulting adhesives to obtain results shown in Table 4, from which it is seen that 1,2,3,4-tetrahydroquinoline is most effective.

Table 4

| Amine | Gelation Time (min) at 82°C. | Gelation Time (day) at 50°C. |
|---|---|---|
| N,N-Dimethylaniline | 0 | 0 |
| Pyrrolidine | 15 | 3 |
| N,N-Dimethyl-p-toluidine | 0 | 0 |
| Anhydrous piperazine | 10 | 3 |
| Tri-n-butylamine | 15 | 3 |
| Quinoline | 20 | 3 |
| 1,2,3,4-Tetrahydroquinoline | more than 100 | more than 30 |

REFERENTIAL EXAMPLE 2

The anaerobic adhesive (a) was incorporated with 100 ppm of polymerization inhibitor indicated in Table 5, and the physical properties were determined to obtain results shown in Table 5, from which it is seen that incorporation of a polymerization inhibitor is quite unnecessary in the anaerobic adhesive composition of this invention.

Table 5

| Polymerization Inhibitor | Setting Time (min) in the Case of 3/8" iron bolts and nuts | Gelation Time (min) at 82°C. |
|---|---|---|
| Hydroquinone | 30 | more than 100 |
| 1,4-Benzoquinone | 30 | more than 100 |
| Hydroquinone monomethyl ether | 10 | more than 100 |
| N,N-di-β-naphthyl-p-phenylene diamine | 20 | more than 100 |
| not added | 10 | more than 100 |

REFERENTIAL EXAMPLE 3

An anaerobic compound indicated in Table 6, which was free of such a polyvalent metal salt as used in this invention, was incorporated with 0.5% by weight of benzosulfimide, 1.0% by weight of 1,2,3,4-tetrahydroquinoline and 3.0% by weight of cumene hydroperoxide, and the stability as the anaerobic adhesive was examined to obtain results shown in Table 6. As is seen from these results, in each case gelation was caused to occur at room temperature before it was tested at 82°C. Thus, it will readily be understood that the polyvalent metal salt used in this invention has a very effective activity as a gelation stabilizer.

Table 6

| Anaerobic Compound | Gelation Time (min) at 82°C. |
|---|---|
| Ethyleneglycol dimethacrylate | 0 |
| Diethyleneglycol dimethacrylate | 0 |
| Polyethyleneglycol dimethacrylate | 0 |
| 2-Hydroxyethyl methacrylate | 0 |
| 2-Hydroxypropyl methacrylate | 0 |
| 5% by weight of anaerobic compound of this invention and 95% by weight of polyethyleneglycol dimethacrylate | more than 100 |

What is claimed is:

1. An anaerobic adhesive composition comprising an anaerobic mixture consisting of (a) at least one polyvalent metal salt of a carboxylate compound of the formula

wherein $R_1$ is hydrogen or methyl, $R_2$ is an aliphatic, alicyclic or aromatic polyhydric alcohol residue, and $R_3$ is an aliphatic, alicyclic or aromatic polybasic carboxylic acid residue,
(b) a solvent compound having in its molecule an acrylic or methacrylic group, and (c) from 0.01 to 5%, by weight of the mixture, of benzosulfimide, from 0.1 to 10%, by weight of the mixture, of an organic peroxide and from .005 to 15%, by weight of the mixture, of a tetrahydroquinoline.

2. An anaerobic adhesive composition according to claim 1 wherein the polyvalent metal is calcium, magnesium or zinc.

3. An anaerobic adhesive composition according to claim 1 wherein the carboxylate compound is ethyleneglycol methacrylate, phthalate, propyleneglycol methacrylate phthalate, ethyleneglycol methacrylate succinate, propyleneglycol methacrylate succinate, propyleneglycol methacrylate hexahydrophthalate, a partially esterified product of a monomethacrylate of bis-phenol dihydroxyethyl ether and succinic anhydride, or a partially esterified product of a monomethacrylate of hydrogenated bis-phenol A and phthalic anhydride.

4. An anaerobic adhesive composition according to claim 1 wherein the solvent compound is selected from the group consisting of (a) alkyl esters of methacrylic acid and acrylic acid, (b) hydroxyalkyl esters of methacrylic acid and acrylic acid, (c) methacrylates and acrylates of polyhydric alcohols, (d) polyester methacrylates and polyester acrylates, (e) said carboxylate compound and adducts of said carboxylate compound and epoxy compounds, and (f) epoxy methacrylates and epoxy acrylates.

* * * * *